(12) United States Patent
Cook

(10) Patent No.: US 11,853,770 B2
(45) Date of Patent: Dec. 26, 2023

(54) REDUCE OS IMAGING TIME USING 'JUST IN TIME' FILE DELIVERY

(71) Applicant: MICROSOFT TECHNOLOGY LICENSING, LLC, Redmond, WA (US)

(72) Inventor: Randall Richards Cook, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/796,507

(22) PCT Filed: Feb. 2, 2021

(86) PCT No.: PCT/US2021/016207
§ 371 (c)(1),
(2) Date: Jul. 29, 2022

(87) PCT Pub. No.: WO2021/158541
PCT Pub. Date: Aug. 12, 2021

(65) Prior Publication Data
US 2023/0205548 A1 Jun. 29, 2023

(30) Foreign Application Priority Data
Feb. 3, 2020 (LU) .................................. 101624

(51) Int. Cl.
*G06F 9/44* (2018.01)
*G06F 9/4401* (2018.01)
(Continued)

(52) U.S. Cl.
CPC .............. *G06F 9/4406* (2013.01); *G06F 8/63* (2013.01); *G06F 16/119* (2019.01)

(58) Field of Classification Search
None
See application file for complete search history.

(56) References Cited

U.S. PATENT DOCUMENTS 8,386,757 B1  2/2013  Gonsalves et al.
9,081,639 B2  7/2015  Bestmann
(Continued)

OTHER PUBLICATIONS

"Search Report and Written Opinion issued in Luxembourg Application No. LU101624", dated Oct. 7, 2020, 13 Pages.
(Continued)

*Primary Examiner* — Fahmida Rahman
(74) *Attorney, Agent, or Firm* — WORKMAN NYDEGGER

(57) ABSTRACT

Embodiments are provided for imaging an operating system (OS) by creating a new OS image from an installer OS image copy maintained in durable storage. During the OS imaging, only a subset of OS files from the installer image are fully copied into the new OS image. Placeholder files are created for other files not included in the initial subset of OS files which were determined to be critical for booting of the OS and/or a minimum set of OS functionality. The placeholder files are distinguished from sparse files and are inaccurately presented by the file system as being full copies of the underlying installer OS image. The data for the placeholder files is only copied when requested, on demand, and/or when there is available/unused processing bandwidth that is subsequently identified after rebooting the computing system with the new OS image.

20 Claims, 5 Drawing Sheets

(51) Int. Cl.
  *G06F 16/11* (2019.01)
  *G06F 8/61* (2018.01)

(56) References Cited

U.S. PATENT DOCUMENTS

| | | | |
|---|---|---|---|
| 9,552,363 B2 | 1/2017 | Novak et al. | |
| 10,095,589 B2 | 10/2018 | Lyadvinsky et al. | |
| 10,140,188 B2 | 11/2018 | Wallace | |
| 11,080,066 B2 * | 8/2021 | Liu | G06F 9/4406 |
| 2007/0067679 A1 * | 3/2007 | Deobald | G06F 9/4406 |
| | | | 714/36 |
| 2010/0325377 A1 | 12/2010 | Lango et al. | |
| 2014/0222765 A1 | 8/2014 | Chen | |
| 2014/0324945 A1 | 10/2014 | Novak et al. | |
| 2017/0161050 A1 | 6/2017 | Raanan et al. | |
| 2018/0012022 A1 | 1/2018 | Azam et al. | |

OTHER PUBLICATIONS

"International Search Report and Written Opinion Issued in PCT Application No. PCT/US21/016207", dated May 7, 2021, 12 Pages.

Satran, et al., "Cloud Sync Engines", Retrieved from: https://web.archive.org/web/20191017041625/https://docs.microsoft.com/en-us/windows/win32/cfapi/cloud-files-api-portal, Feb. 6, 2019, 1 Page.

Schimscheimer, Fred, "VMware Instant Clone Technology for Just-In-Time Desktop Delivery in Horizon 7 Enterprise Edition", Retrieved from: https://blogs.vmware.com/euc/2016/02/horizon-7-view-instant-clone-technology-linked-clone-just-in-time-desktop.html, Feb. 11, 2016, 7 Pages.

Spitze, Phil, "Send Ghost to the Grave: Problems and Alternatives to Imaging using Ghost", Retrieved from: https://www.appsanywhere.com/resource-centre/send-ghost-to-the-grave-problems-and-alternatives-to-imaging-using-ghost, Sep. 24, 2018, 6 Pages.

Teper, Jeff, "Introducing OneDrive Files On-Demand and Other Features Making it Easy to Access Files", Retrieved from: https://www.microsoft.com/en-us/microsoft-365/blog/2017/05/11/introducing-onedrive-files-on-demand-and-additional-features-making-it-easier-to-access-and-share-files/, May 11, 2017, 6 Pages.

"Notice of Allowance Issued in European Patent Application No. 21707125.7", dated Feb. 8, 2023, 7 Pages.

"Notice of Allowance Issued in European Patent Application No. 21707125.7", dated Mar. 14, 2023, 7 Pages.

"Notice of Allowance Issued in European Patent Application No. 21707125.7", dated Jul. 27, 2023, 2 Pages.

* cited by examiner

REDUCE OS IMAGING TIME USING 'JUST IN TIME' FILE DELIVERY

BACKGROUND

It sometimes desirable to reformat an operating system (OS) of a computing system, such as, for example, when the OS becomes corrupted or according to a predetermined maintenance schedule. A user may also want to reformat the OS of their computing system when they are preparing to sell or discard the computing system, to erase or wipe out any personal data that may persist on the computing system and/or to remove installed applications that may be associated with ancillary costs and subscriptions paid by the user. Some enterprises also schedule regular lifecycle maintenance that will result in reformatting of their computing systems on a predetermined or periodic basis.

During reformatting, it is typical for the files of an operating system to be copied from a backup or installer copy of the OS that is maintained as a durable copy of the OS image, such as, for example, within a locked portion of the hard drive of the computing system. Examples of durable copies of an OS image include the initial installer OS image provided with the computing system, as well as backup/ghost copies of the OS image which can be created/saved during use of the computing system. Durable copies of the OS image can also be stored separately from the computing system on a portable hard disk and/or a remote server.

During reformatting of the OS, the current OS files/folders are replaced by the files/folders maintained in the OS image of the installer/backup copy. For at least this reason, reformatting of the OS is often referred to by terms such as OS reimaging, OS imaging, reimaging the OS and imaging the OS.

While OS imaging/reimaging is sometime desirable, for the reasons mentioned above, it is also computationally very expensive and time consuming to copy of all files from the durable copy of the OS image to the new OS image. Much of this computational expense and time is unnecessary, however, particularly when considering the magnitude of unnecessary data that is initially copied during the reimaging of an OS. By way of example, it is estimated that many computing systems utilizing Microsoft's Windows will typically utilize only about 1-2 GBs of the 20+GBs of Windows files that are normally contained within the durable copy of the Windows OS image. This disparity occurs, for example, due to the broad range of functionality built into the Windows OS image, including different language packs and specific application functionality that may not always be utilized, particularly by all users, but which is nonetheless provided for available use when desired.

It is acknowledged the amount of data that is unnecessarily copied during reimaging will depend on the capabilities and functionality of the operating systems being reimaged, as well as how different users desire to utilize their computing systems. However, many of the available OS files/folders are not required during booting of the OS and/or right after the initial reformatting/reimaging of their OS. Some experts have determined, for example, that less than 20% of the OS image files/folders would be needed to be copied from a backup OS image during reimaging to provide a functional OS image that is bootable and that will still have a base set of desired functionalities that is most commonly utilized within a short period of time after booting. However, notwithstanding this knowledge, traditional reimaging processes still involve the copying of unnecessary files/folders that are not required for booting of the OS and that may, in fact, never be required/used.

The foregoing traditional reimaging processes represent a significant waste of computational expense and delay during OS imaging. Accordingly, there is an ongoing need and desire for improved systems, methods and devices for OS imaging and, particularly, for improved systems, methods and devices that can be utilized to reduce OS imaging time.

The subject matter claimed herein is not limited to embodiments that necessarily solve any particular disadvantages of traditional systems or that operate only in environments such as those described above. Rather, this background is only provided to illustrate one exemplary technology area where some embodiments described herein may be practiced.

BRIEF SUMMARY

Embodiments disclosed herein relate to systems, methods, and devices that are configured to facilitate imaging of an operating system (OS imaging) and, even more particularly, for systems, methods and devices that can be utilized to reduce OS imaging time.

In some embodiments, a new OS image is copied from, or imaged/reimaged, from an installer copy of the OS that is stored in durable storage and that includes a plurality of OS files. During the OS imaging, only a subset of the OS files is entirely copied from the installer copy into the new OS image from the installer/durable copy of the OS image. In some instances, the subset of files selected to be fully/completely copied consists of, or is otherwise limited to, a minimum set of OS files required to create a new OS image that is bootable by a computing system with a predetermined set of OS functionality (e.g., files required to boot the OS and/or files that are anticipated to be used shortly after booting the OS). The remaining files are only copied when requested, on demand, and/or when there is available/unused processing bandwidth that is subsequently identified after rebooting the computing system with the new OS image.

Disclosed embodiments include a computer-implemented method for OS imaging (reimaging an OS for a computing system) in response to a detected request to reimage the OS. The method includes the computing system identifying a minimum set of OS data that is required to create a new OS image that is bootable by the computing system with a predetermined set of OS functionality and identifying a remaining set of OS data that is determined to not be required to at least create the OS image that is bootable with the predetermined set of OS functionality.

The method also includes, for the minimum set of OS data that is determined to be required, creating the new OS image by creating a copied set of OS files in the file system from corresponding files in the durable copy of the OS image containing the same minimum set of OS data. Additionally, for the remaining set of OS data that is determined to not be required, the method includes further creating the new OS image by creating placeholder files comprising unhydrated and/or only partially hydrated copies of corresponding OS files that are found in the stored durable copy of the OS image, wherein the unhydrated and partially hydrated copies omit at least some of the data from the files contained in the stored durable copy of the OS image.

The method also includes the system presenting one or more of the placeholder files of the new OS image inaccurately, to one or more OS components, as being completely hydrated files (e.g., complete/functional copies containing all of the data from the corresponding files maintained by the durable copy of the OS), even though the placeholder files are not completely hydrated (since they omit at least some of the data from the associated files of the durable OS image).

Other embodiments include the computing system subsequently hydrating the placeholder file(s) by completing the copy of data from the durable OS image to the new OS image associated with the placeholder file(s), on demand and/or in response to detecting available bandwidth and/or sequential ordering. Yet other embodiments include the computing system refraining from hydrating one or more of the placeholder file(s) in response to determining it is not necessary to fully hydrate the place holder file(s) (i.e., determining it is not necessary to copy all data from the durable OS image into the new OS image the placeholder file(s)).

This Summary is provided to introduce a selection of concepts in a simplified form that are further described below in the Detailed Description. This Summary is not intended to exhaustively identify key features or essential features of the claimed subject matter, nor is it intended to be used in limiting the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail with the accompanying drawings in which.

DETAILED DESCRIPTION

Disclosed embodiments are operable to facilitate OS imaging, both initial imaging of an OS, as well as reformatting or reimaging of an existing OS to create a new OS image that replaces a current OS image that is bootable by the computing system for use during runtime, by copying OS files/data from a durable copy of an existing OS image into the new OS image.

Figure 1:
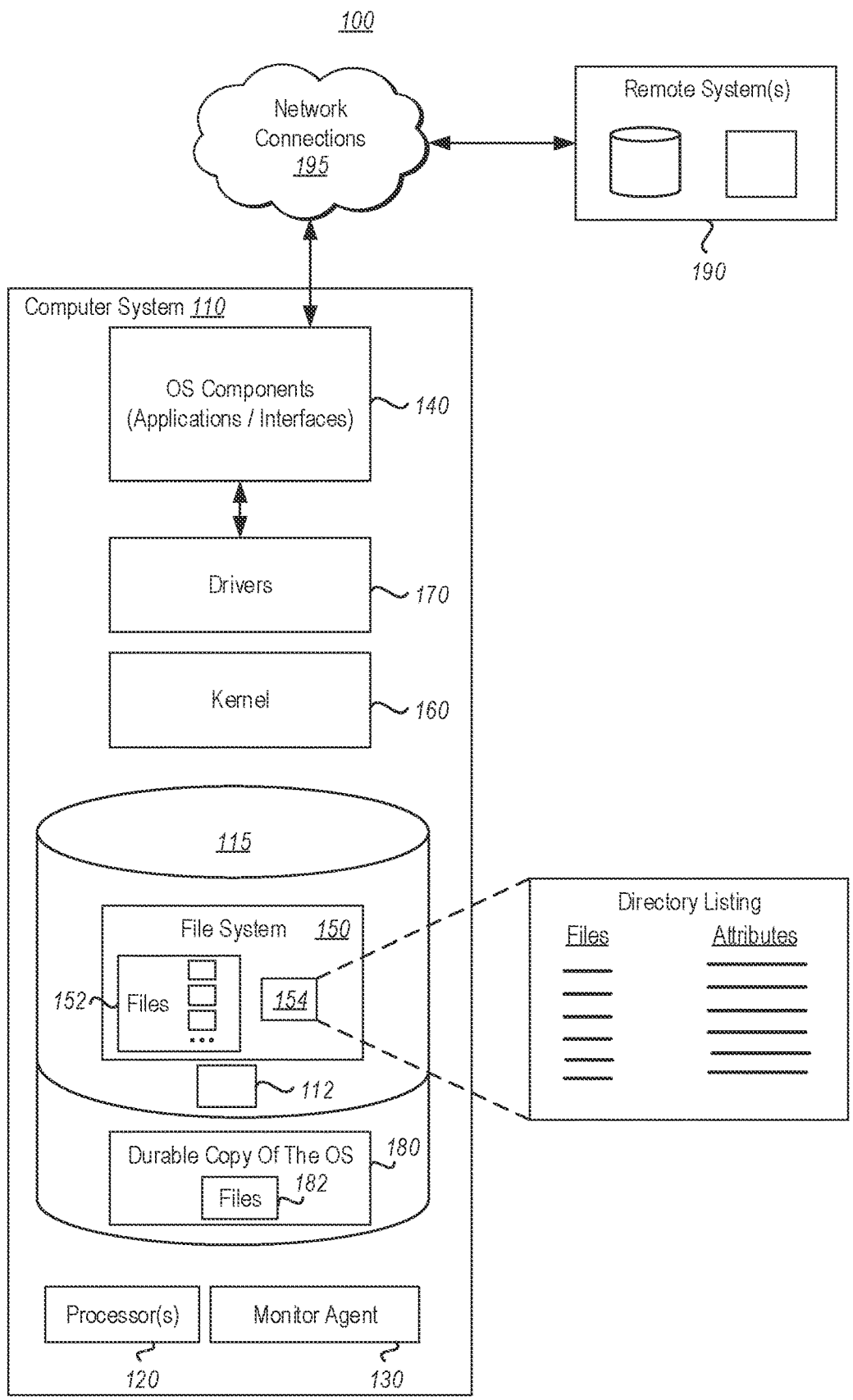
FIG. 1 illustrates an example architecture that includes a computing system that includes and/or that is capable of being utilized to implement the disclosed embodiments.

FIG. 1 illustrates an example computing architecture 100 for implementing the disclosed embodiments and which includes a computing system 110 having various components that will now be described, each of which is stored within the storage 115 of the computing system and/or within one or more remote system(s) 190, as will be described.

As shown, the computing system 110 includes storage 120 and one or more processor(s) 120. The storage 115 stores computer-executable code 112 which is executed by one or more of the processor(s) 120 to instantiate other computing system components (e.g., the monitor agent 130, the OS components 140, the file system 150, the kernel 160 and the drivers 170. The processor(s) 120 also execute the computer-executable code 112 to implement the disclosed methods, such as the methods referenced in FIGS. 3-5.

As will be described in more detail below, the monitoring agent 130 is used to track and to identify patterns of use by the computing system 110, including the use of different applications, interfaces and other OS components 140, as well as utilization of different files 152 in the file system 150, and user behaviors and preferences with the computing system. This information is used by the monitor agent 130 and/or the file system 150/drivers 170 to determine which files/data is required to be copied from the durable copy of the OS 180 during OS imaging/reimaging.

While the storage 115 is presently illustrated as containing the file system 150 and computer-executable code 112, but not the kernel 160, drivers 170, monitoring agent 130, nor the OS components 140, it will be appreciated that this visual segregation is done merely to facilitate the discussion herein and to highlight a select few of the computing system components. This should not be construed as representing any actual physical separation of storage components or the distribution of the illustrated components to different physical storage containers. For instance, the kernel 160, drivers 170 and OS components 140 are all maintained/stored within a single hard drive of storage 115 in some embodiments.

That said, it is also noted that the storage 115 is configurable to be segmented/partitioned into different storage containers, such as, for example, to separately store a durable copy of the OS 180 (e.g., a backup installer copy of the OS having a complete set of the OS files 152 required to at least boot the OS) that is maintained in discrete partition of durable storage that persists during rebooting of the computer and even during reformatting of other portions of the storage 115 containing the current runtime OS and file system.

The storage 115 is also configured, in some instances, with a combination of volatile and non-volatile storage. Preferably, however, the file system and other OS components, including the applications and interfaces (140) used by the runtime OS to perform desired functionality and which may include any applications/interfaces used by the OS are all stored in non-volatile storage.

The OS components 140 are currently listed as including applications and interfaces, such as original OS applications and interfaces, as well as third party applications and interfaces configured to run with the OS. The OS components 140 also include, in some instances, the underlying kernel 160 and drivers 170 of the computing system 110, even though they are shown separately, and which are also maintained in non-volatile storage as part of the OS image.

In some instances, the storage 115 comprises a hard drive. In other instances, the storage 115 comprises flash storage and/or other durable storage and/or a combination of a hard drive and other durable storage.

The storage 115 is presently shown as being maintained entirely within a single stand-alone computing system 110. In some alternative embodiments, the storage 115 is distributed between different computers/computing systems, such as remote system(s) 190, which are connected through one or more wired and/or wireless network connections 195, and such that the computing system 110 can be viewed as a distributed computing system that includes one or more remote system(s) 190 that each comprise their own storage and corresponding computing components to enable the disclosed functionality (such as those described in reference to computing system 110).

During use, the computing system 110 receives a request to image an OS from the durable copy of the OS 180. This request may be a request to create an initial install of the OS (if it is not already fully installed) and/or to reimage the OS of the computing system from the durable copy of the OS 180 (which may be stored entirely locally, such as on the hard drive, or in some instances that is stored at least partially remotely).

The durable copy of the OS image, referred to as the durable copy of the OS 180 includes all the files 182 that are necessary to boot the OS with a minimum set of OS functionality (which will be described in more detail below). By way of example, the durable copy of the OS 180 includes files 182 for at least instantiating the kernel 160, the drivers 170 and the file system 150. In some instances, the durable copy of the OS 180 includes also files for instantiating other OS components 140 (such as the monitor agent 130 and other components). In alternative embodiments, the durable copy of the OS 180 omits and does not include files for instantiating the monitor agent 130 and/or at least some of the other OS components 140, which are, instead, maintained and accessed from the one or more remote system(s) 190.

Reference was earlier made to the determination made by the monitor agent as to the minimum set of functionality that is determined to be required to boot and/or to operate the OS. It will be appreciated that this determination can be made in various ways. According to some embodiments, for example, the monitor agent 130 (locally or remotely) tracks files that are requested during booting of the OS to learn/ track which files are essential for booting. The monitor agent 130 also tracks different types of file requests that are made to distinguish between requests that rely on data in the files and/or that require actual data to be contained in the files, such as for actual read and write requests, and requests that are alternatively made as data validation or reference requests that inquire whether the files have been created (such as to enable anticipated/subsequent use of the files) and/or that merely require metadata for the referenced files rather than requiring the actual underlying data of the referenced files.

The monitor agent 130 is able to make these determinations, in some instances, by using machine learning models/ data incorporated into the monitor agent 130 and/or that are referenced by the monitor agent 130. In some instances, for example, the monitor agent 130 is a machine learning engine or component that is trained to track actual usage of file data that is requested during and after booting operations and to determine which files are essential for booting the OS and/or which files are most likely to be immediately accessed after booting and/or which files are most likely to be used by one or more different users after booting. For instance, functionality like networking functionality may be determined to be critical or a likely anticipated functionality shortly after booting. Other applications, like word processing and graphics processing may also be determined to be preferred functionality for one or more particular users that will likely be invoked shortly after booting, based on prior user behaviors/preferences of users analyzed in training data of the machine learning model(s) and/or based on behaviors/preferences of specifically known users associated with the computing system being reimaged.

In view of the foregoing, it will be appreciated that the monitor agent 130 considers various factors to make the determination of which files to be fully copied during imaging, including considerations of the computing system type, OS configuration, OS boot processes, and the known and/or monitored user behaviors, including tracked user requests made on the computing system most frequently after booting the computer, known and/or monitored use of the computing system and particular OS components (e.g., applications and interfaces that are most recently and/or most commonly invoked during use), and corresponding training data that includes the corresponding behaviors, uses and profiles of other users, computing systems and operating systems on the remote system(s) and/or other training data sets.

The monitor agent also considers information that identifies undesired applications/functionality that has never been used and/or that is infrequently used within a short duration after booting a computer (e.g., within minutes, hours, or days of booting) by particular users associated with the computer and/or by other users utilizing similar computers and that have similar user profiles. This information is utilized, in some instances, for example, to identify files to omit from the limited minimum set of data to be copied from the durable copy of the OS into the new OS image during the imaging processes and/or to further train the machine learning models used by the monitor agent 130.

The machine learning engine (when incorporated into the monitor agent and/or when used by the monitor agent) can utilize any known machine learning model, including but not limited to deep neural networks, regression, clustering and/or other machine learning models, utilizing any combination of supervised and unsupervised training processes.

When a new OS image is created (imaged/reimaged) from the durable OS image, the new OS image includes an underlying kernel 160 that manages the core aspects of the operating system, as well as the OS file system 150 that includes and organizes all of the files of the new OS and the drivers 170 for interfacing with the file system and storage 115.

Some of the files 152 managed by the file system are essential to boot the OS and to provide a minimum set of OS functionality. Other files are non-essential files that are available to use for expansive OS functionality, but which are not required to boot the OS.

The file system 150 is also configured to keep track of the different file attributes/metadata of the files in the file system 150. These attributes include, for example, the file path/storage location of each file, the handle/name of each file, as well as many other attributes of the files. This information is provided by the file system to OS components that request access to the files in the file system.

When a request is made for a file or file data, for example, during booting and/or running of the OS, the file system 150 or drivers 170 (e.g., file system driver and hard drive drivers) will access and provide the requested file data to the requesting components. This requested data will include, in some instances, the handles to the requested data/files.

However, in some instances, the requests for files/data in the file system do not actually require access to the underlying data of the files. Instead, they are mere requests for information about the files, such as the metadata/file attributes, to validate the existence of the files and/or to perform a non-critical function that is not dependent on the actual accuracy of the metadata and that does not require actual access to all of the data contained in the referenced file(s). For instance, a request to access only a portion of data in a file does not require all of the unrequested data in the file to be present. Likewise, a request to check the type of a file to verify compatibility with the file or to verify that the file exists does not require that the underlying data of the file be presently copied into the file.

In some embodiments of the disclosed invention, the drivers 170 include one or more specialized file system driver(s) or driver layer (not specifically illustrated in FIG. 1, but which is included in drivers 170) that will intercept all requests for OS data made to the file system 150 during boot and/or during runtime to determine whether each request for OS data (e.g., a request for a folder, file and/or data in a file) actually requires the data and/or whether it is only a request that requires generalized/validation knowledge about the OS data (e.g., to check to see whether the data/file has been created/exists, or to inquire about specific metadata/attributes of the file/data without needing access to the specific data).

Then, depending on whether the requested OS data is actually required or not, and depending on whether the data is actually present in the file system, the specialized file system drivers will either provide the data (when present) and/or alternatively, if the data is required and not present, the system will initiate the immediate transfer of data from the durable copy of the OS image to make a copy of that data to the corresponding file in the file system for the new OS image. Additionally, and/or alternatively, if the requested data is not present, and is also determined to not be required for the minimum set of OS data used to create a bootable OS image with a minimum set of functionality, the file system driver will inaccurately reflect that the data is present (even though it is not) so as to satisfy the request. This act of reflecting the data is present may include providing metadata for a placeholder file that is either accurate or inaccurate relative to the actual data associated with the placeholder file that is currently stored in the durable copy of the OS.

It will be appreciated that the process of providing information (even if inaccurate) is beneficial in some instance, for example, to avoid having to copy the entirety of all files from the durable copy of the OS for the new OS image, especially file data that is not essential during booting or initially operation of an OS after imaging (and until/unless it is actually required) and to prevent an OS component requesting the data from generating an error that may hold up the booting and/or processing of the OS with a minimum set of functionality. This can also help reduce the time it takes to generate an initially bootable and operational OS (at least with a predetermined minimum set of OS functionality, which is less that the full OS functionality) and which can be more fully updated after booting.

Accordingly, rather than copying all files from the durable copy of the OS image during imaging, some files are created in the file system associated with the new OS image as placeholder files that omit some of the data from the corresponding files maintained in the durable copy of the OS image. Each of these placeholder files is created with a minimum set of attributes that are determined to be required by the file system/drivers to convincingly present the placeholder files as completely copied files from the durable OS image to one or more of the requesting OS components.

In some instances, the minimum set of attributes for the placeholder files includes at least one of a file name or handle, and a file size and a file type. Other attributes required, in some instances for some placeholder files, also include, but are not limited to one or more of a date created, a date modified, author, permissions, address information, duration, frame rate, and/or any combinations of other attributes.

It will be appreciated that the minimum set of attributes will also vary, in some instance, depending on the file types. By way of a few examples, the additional attribute(s) required will include, for example, a duration for an audio file, a framerate for a video file, an organizer or attendees for an event file, a sender/recipient address for an email file, and so forth. These attributes are not required for placeholder files of a word processing type, however.

During creation of the placeholder files, in some embodiments, the system will allocate space for each of the placeholder files within the file system based on the known file size of the corresponding durable OS image copies(s) and will organize and list the files in the file system directory listing with all of the metadata/file attribute information that is required to present the placeholder files as complete copies of the corresponding durable OS image files, including at least a file type, a file name/handle, and a file size.

One advantage of allocating space for the placeholder files during their creation is that it means that there will always be enough space to fully hydrate the placeholder files, if/when they are subsequently hydrated according to methods disclosed in reference to FIGS. 4 and 5, for example.

In some alternative embodiments, space is not allocated for the placeholder files unless/until it is determined that the place holder file is likely to be hydrated. This will prevent locking away storage/computing resources that are not ever used if the placeholder files are never hydrated.

In some hybrid embodiments, the system will identify a probability of hydration for the placeholder files (e.g., based on machine learning techniques referenced throughout this disclosure, which are based on historical trends associated with user preferences and/or use of the system, OS and corresponding files). Then, based on the determined probability, the system will only allocate space in the file system for placeholder files that are determined to have a probability of being hydrated above a threshold probability (e.g., 10%, 20%, 30%, 40%, 50%, or more). This probability determination may also be based on or include the probability that the placeholder file will be hydrated within a predetermined period of time (e.g., within the next hour, day, week, month, or other period if time).

However, without making the complete copy of the file during imaging, the system may not know all of the correct attribute information for a file. For instance, the system may not know how much space a file will take up by the time it is copied, particularly if it will be a decompressed copy of a file in the durable OS image. The system may also not know, for instance, the duration of a video until it is played and/or if that duration information is not included in the metadata of the durable OS image copy.

In such instances, the system may estimate or make up the metadata information for each placeholder file based on predetermined values to use for different files of the same types and/or by basing the value of the attribute on the corresponding existing attribute of another file of the same type that has already been copied. This means that the metadata/attributes presented for the placeholder file(s), will be inaccurate in some instances. This inaccuracy also includes, in some regards, the specifying of the type of the placeholder file (even if it matches the same type associated with the durable OS image copy) since the placeholder file is empty and not yet filled with data formatted into that particular type and may not be formatted unless/until the data from the durable OS image file copy is copied over into the new OS image placeholder file.

The values that are made up for the file attributes are values that are determined by the file system to be enabled to satisfy requests during booting of the OS that will not negatively impact other OS processes performed during booting of the OS. This determination is made during training and use of the machine learning modules mentioned earlier and by the monitor agent identifying which files must be completely copied to create a new OS image that is bootable by the computing system with a predetermined set of OS functionality, as described earlier.

According to some embodiments, as mentioned above, the new OS image will incorrectly reflect that the placeholders are actual copies of the corresponding files from the durable OS image. This presentation by the file system/drivers will be inaccurate, because at least some of the files are mere placeholders, as mentioned above, that are not fully hydrated (meaning that they are not complete copies and that they only contain a limited set of the data from the corresponding file in the durable OS image, rather than the full set of the data for that corresponding file). In this regard, the placeholder files can be understood to be partially hydrated files or unhydrated files, where an unhydrated file in the new OS image omits all of the data from the corresponding file in the durable OS image (other than metadata/essential attribute information) and where a partially hydrated file in the new OS image contains some data, but not all data, from the corresponding file in the durable OS image.

Said another way, the placeholder files (comprising partially hydrated and unhydrated files) are presented by the new OS image file system/drivers, in some instances, as though they are completely hydrated (meaning that they will be presented as though they are complete copies of the durable/backup OS image, even though they are mere placeholders that are not complete copies).

In regard to at least the foregoing, the placeholder files of the present disclosure (which are presented as complete copies/fully hydrated files) by the file system/drivers are distinguished from sparse files, which are not presented as fully hydrated files.

The foregoing presentation of placeholder files (even with inaccurate metadata) and without requiring the processing overhead of copying the full file during imaging, is particularly beneficial however, when considering a OS component may request this information during booting or initial/anticipated operations after booting when determining whether a particular file has been created or has certain attributes before proceeding to a next process (even though the underlying data is not critical for booting of the OS and even though the underlying data is not required/requested).

In particular, by presenting the placeholder file as a completely hydrated (full copy) file, an OS component that is requesting information about a particular placeholder file during booting and/or during initial processing after booting will be enabled to proceed with its processing using the placeholder information (which may be false) and without imposing delays that would otherwise be required to make a completely copied OS file rather than the placeholder file that is generated from the corresponding durable OS image file (and/or without requiring all OS files to be fully copied) and while still enabling the booting of the OS and/or other predetermined sets of OS functionality without the complete copy/copies of the files in the durable OS image.

As suggested earlier, the monitor agent 130 will rely on previous use/behavior data and machine learning algorithms to predetermine which files/portions of files are critical for booting of the OS and to provide the minimum set of OS functionality. This minimum set of critical files/or portions of files (i.e., the minimum set of OS data that is required to create a new OS image that is bootable by a computing system with the predetermined set of OS functionality) will include, in some instances, all of the files having data that is known to be required to be accessed or accurately reported during booting to avoid causing a booting error or other negative impacts on booting of the OS and/or other errors to OS processes that are anticipated to be performed within a short period of time after booting (e.g., within a few minutes, hours or days after booting).

A listing of this minimum set of data (e.g., the critical set of files and/or portions of files) is stored within a record maintained by the monitor agent and that is stored locally and/or remotely and is accessed in response to receiving the request to image/reimage the OS. Then, during imaging/reimaging, the files/data comprising the listed minimum set of data is copied from the durable copy of the OS to the new OS file system. Placeholder files are also, alternatively, created for the other files/data of the durable copy of the OS, which comprise the remaining set of data that is determined to not be required for creating a new OS image that is bootable with the predetermined set of OS functionality.

With regard to the foregoing, it will be appreciated that the term file is broadly used to reflect a set of organized data that is accessible by a single file system handle (e.g., file name) and which typically includes an extension to reflect a file type. Non-limiting examples of files include audio files (e.g., mp3, wma, way, and so forth), video files (e.g., mp4, avim, mov, and so forth), worksheet files (e.g., xlsx, odt, and so forth), word processing and text files (e.g., docx, txt, and so forth), system and kernel files (e.g., dll, dlg, sys, and so forth), mail and calendar files (e.g., pst, email, and so forth), and/or code files (e.g., java, c, class, and so forth). Files as defined herein, in some alternative instances, even include groupings of other files (e.g., a folder, a sub-directory or a directory, for example).

Sometime during and/or after creation of the new OS image, the file system creates a directory listing, index or another type of data structure that can be used to navigate the files of the file system and to reflect the attributes of the files in the file system, including the completely hydrated/copied files, as well as the placeholders.

Figure 2:
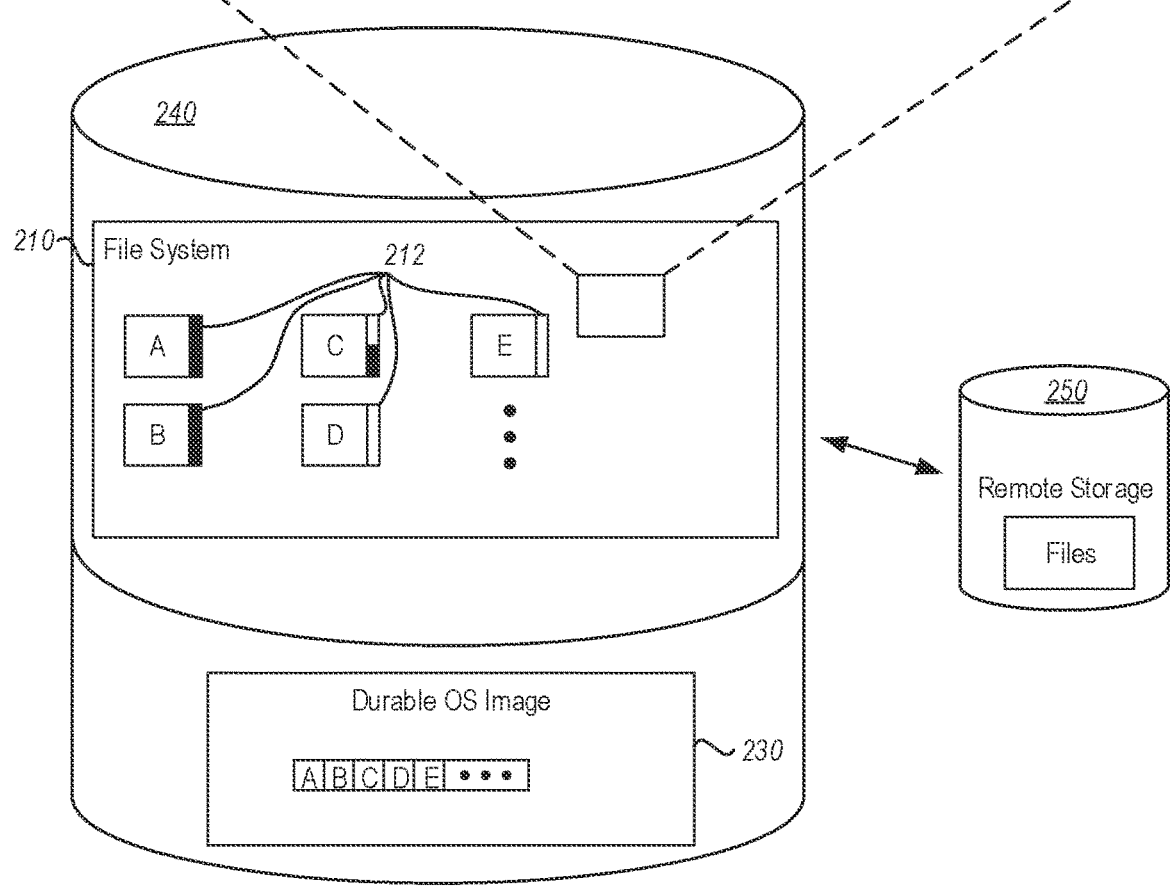
FIG. 2 illustrates an abstraction of operating system elements, including a file system and files, along with a directory listing of the file system, as well as a corresponding durable OS image.

Attention is now directed to FIG. 2, which illustrates an abstraction of operating system elements 200, including a file system 210 with files (e.g., files A, B, C, D, E), along with a file system directory listing 220 the reflects files in a file system for a new OS image and the corresponding file attributes. FIG. 2 also illustrates the corresponding durable OS image 230 in storage 240 having files that are copied/referenced during the OS imaging, as well as a remote storage 250 containing one or more files for use by the file system to determine attributes to use for the placeholder files. In some instances, the files of the remote storage 250 contain a copy of the durable OS image.

As reflected, files A, B, C, D and E . . . are associated with the Durable OS image and are used to create the new OS image used by the system and that correspond with the file system 210 shown. The directory listing 220 is a visualization of a directory of the file system and includes entries for each of the referenced files, along with corresponding file attributes. In the present example, which is merely illustrative and non-exhausting, the file attributes tracked by the file system for the OS files and which are referenced in the directory listing include a file path, a handle/name, a date/time created, a size, a type and various other attributes. Any combination of these attributes/metadata for the files may be requested of and may be presented by the file system/drivers.

As previously mentioned, some of the metadata/attributes reflected for a file will not be accurate in some instances. This is particularly true for placeholder files (e.g., files C, D, E) that are only partially hydrated (e.g., file C) or that are unhydrated (e.g., files D and E). The level of hydration (e.g., the hydrated and unhydrated terms reference the relative amount of data copied into the file system file of the new OS image relative to the corresponding files of the durable OS image, as mentioned earlier). The quantity of data copied into the files is reflected by the fill bar on the right side of each file shown in the file system 210, with the fill bar of files A and B being completely filled (completely hydrated) and the fill bar for file C being partially filled (partially hydrated) and the fill bar of files D and E being completely empty or unfilled (unhydrated).

In some instances, the directory listing 220 of the file system 210 is a data structure referenced by the file system/drivers that is not reflected to the user in a visual interface. In some embodiments, the directory listing 220 includes a visual interface component that reflects the values for the different files and file attributes to a user of the computing system on a display of the computing system (not illustrated in the computer architecture of FIG. 1). This visual interface includes, in some instances, visual objects that reflect the level of hydration of the different files, such as by objects 222 that include check boxes (e.g., visual objects 223, 224 and 227) or other visual element to reflect the corresponding files comprise fully hydrated copies of the files, another type of visual element (e.g., visual object 225, comprising the letter 'P' or another visual element) to reflect the corresponding file is a partially hydrated placeholder file, and yet another type of visual element (e.g., visual object 226, comprising an 'X' or another visual element) to reflect that the corresponding file is a completely unhydrated placeholder file. In other embodiments, colors, status bars, percentage values or other elements are used to reflect and distinguish between different types of fully copied files and placeholder files (e.g., partially hydrated files and/or unhydrated files).

In some instances, the visual interface inaccurately presents files as being fully hydrated to a user inaccurately, similar to how the system presents the file completion status to other OS components. For instance, with regard to file E, which is an unhydrated placeholder file, the visual object 227 of a check box suggests/implies that the file is completely loaded/copied into the file system, even though it is not. While this embodiment is not necessarily preferred, it is being made at this time to reflect another way in which the system may provide inaccurate information relative to the copied/hydration status of a placeholder file. This embodiment would be useful, however, when the system makes such an inaccurate representation after determining that the file is not essential or critical for any functioning invoked by the user, so that the user (when debugging a potential problem) does not try to fully hydrate the file by initiating copying of the corresponding file from the Durable OS image 230 into the file system copy of the file.

Figure 3:
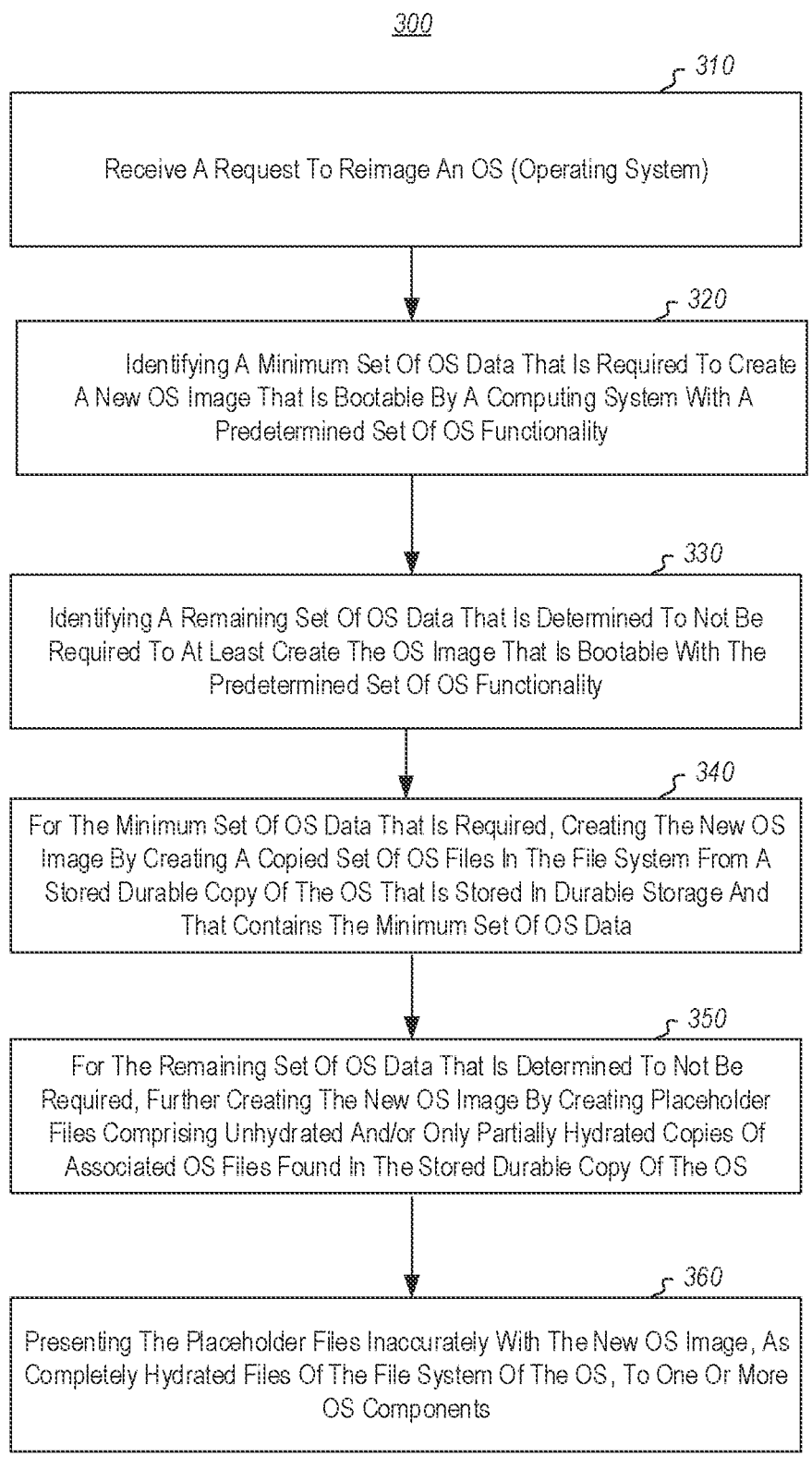
FIG. 3 illustrates a flow diagram of an example method for performing OS imaging.
Figure 4:
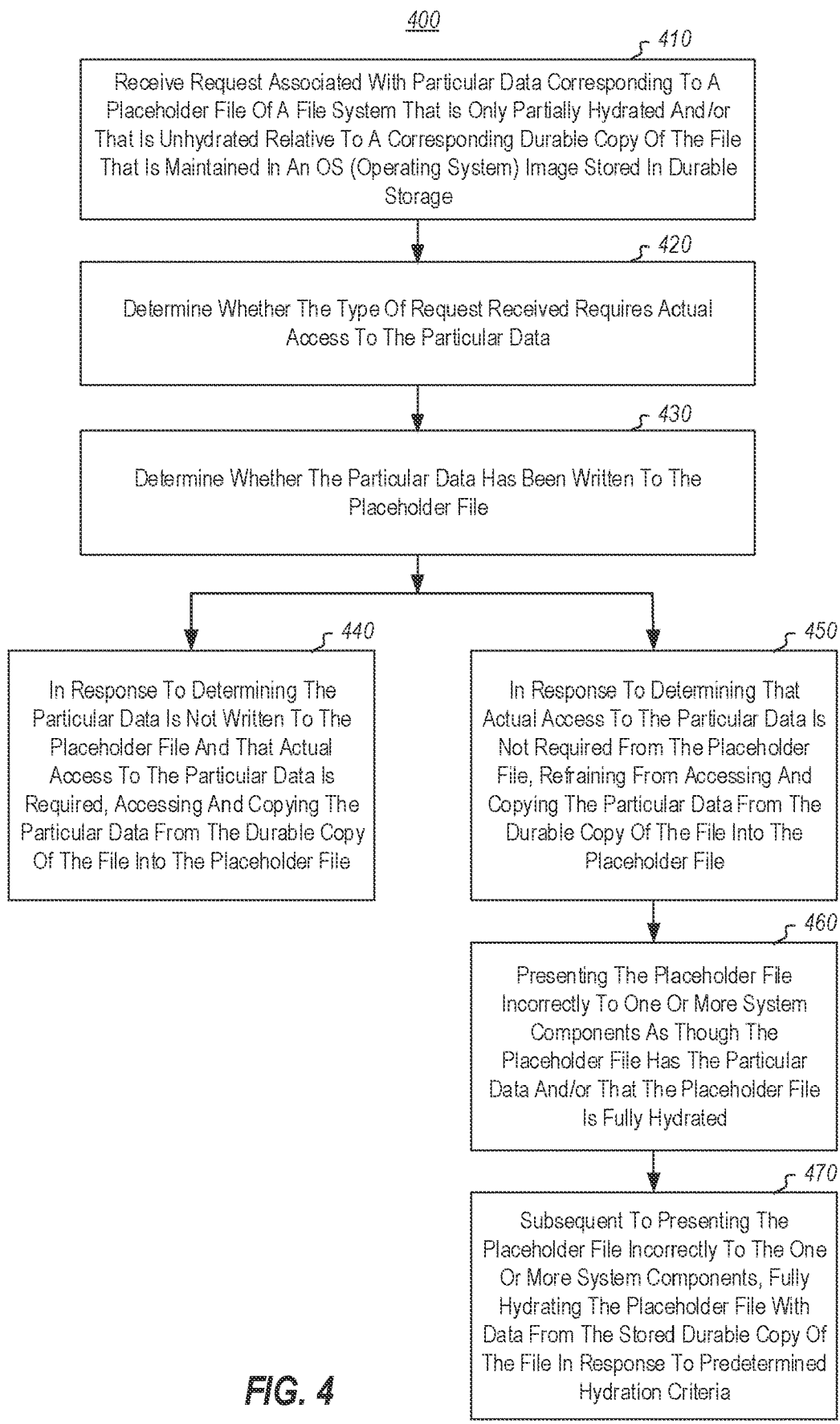
FIG. 4 illustrates a flow diagram of an example method for processing requests for files in a reimaged OS that includes at least one placeholder file that is only partially hydrated and/or that is unhydrated relative to a corresponding durable copy of the file that is maintained in an OS (Operating System) image stored in durable storage.
Figure 5:
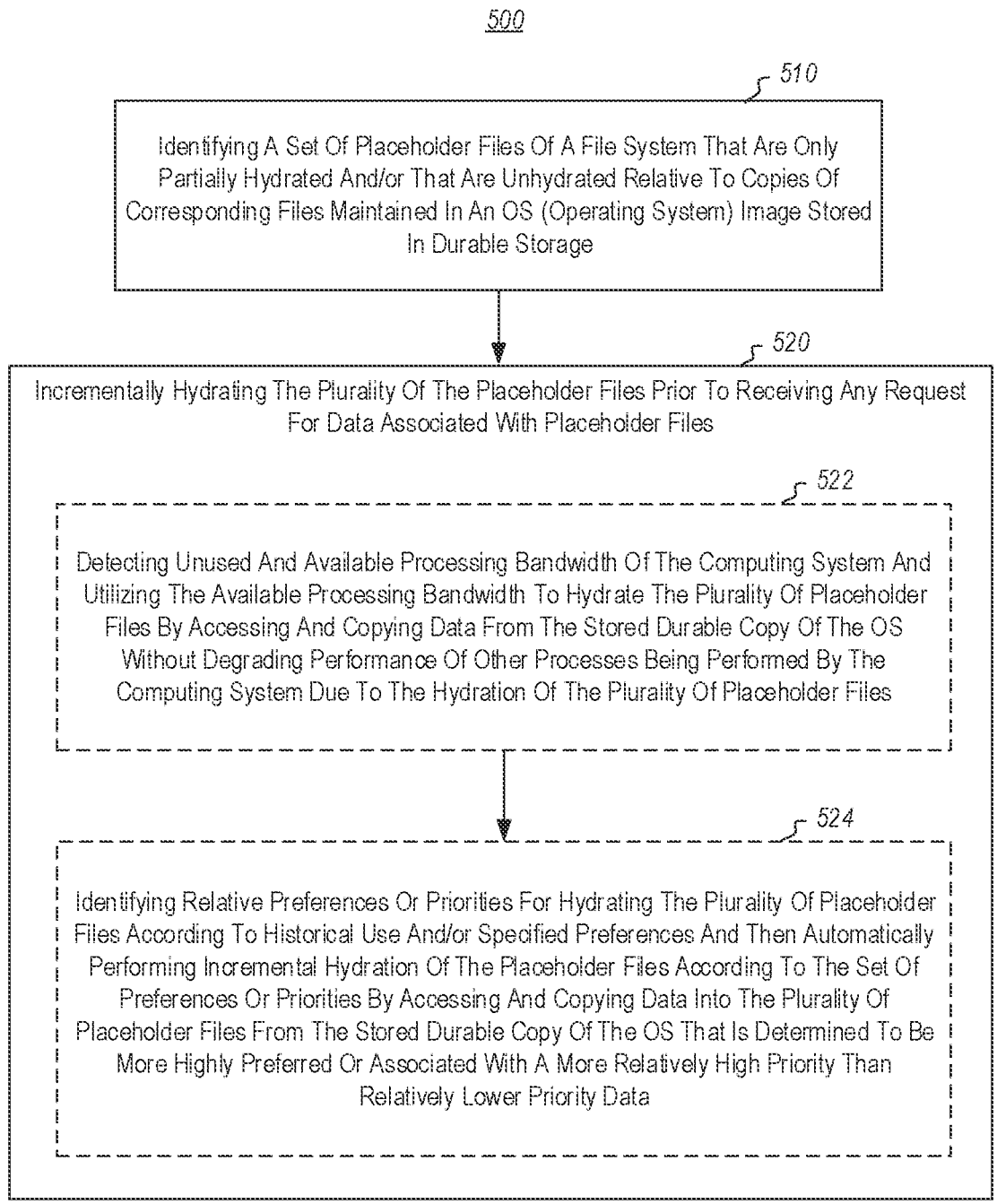
FIG. 5 illustrates a flow diagram of an example method for incrementally hydrating placeholder files from a reimaged OS that are only partially hydrated and/or unhydrated relative to corresponding durable copies of the files that are maintained in an OS (Operating System) image stored in durable storage.

Attention will now be directed to FIGS. 3-5, which illustrate flow diagrams of example methods implemented by computing systems, such as described above in reference to FIGS. 1 and 2 and that are associated with performing OS imaging using Just in Time file delivery (FIG. 3), methods for processing requests for files in a reimaged OS that includes at least one placeholder file that is only partially hydrated and/or that is unhydrated relative to a corresponding durable copy of the file that is maintained in an OS (Operating System) image stored in durable storage (FIG. 4), and methods for incrementally hydrating placeholder files from a reimaged OS that are only partially hydrated and/or unhydrated relative to corresponding durable copies of the files that are maintained in an OS (Operating System) image stored in durable storage (FIG. 5).

As shown, the methods referenced by the flow diagram 300 of FIG. 3 includes and act of a computing system receiving a request to reimage an OS of the computing system by creating a new OS image from a stored durable OS image (act 310). This act includes identifying the stored durable OS image to use for reimaging from within the computing system storage or from a remote system.

Thereafter, the computing system identifies a minimum set of OS data that is required to create a new OS image from the stored durable copy of the OS image to create a new OS image that is bootable by the computing system with a predetermined set of OS functionality (act 320), as well as a remaining set of OS data from the durable copy of the OS image that is determined to not be required to at least create the OS image that is bootable with the predetermined set of OS functionality (act 330). In some instances, the minimum set of OS data that is required is less than 50%, less than 60%, less than 70% or less than 80% of the remaining set of OS data.

In some instances, act 320 includes determining the predetermined set of OS functionality for the minimum set of OS data utilizing any of the techniques described above in reference to FIG. 1 and also includes, in some instances, an analysis of files/functionality that are recently and/or frequently invoked during booting of the OS and/or that are recently and/or frequently invoked within predetermined periods of time subsequent to prior booting of the OS on the computing system.

The illustrated acts of the methods associated with the flow diagram 300 of FIG. 3 also include, for the minimum set of OS data that is required, creating the new OS image by creating a copied set of OS files in the file system from a stored durable copy of the OS that is stored in durable storage and that contains the minimum set of OS data (act 340). Additionally, the computing system also creates placeholder files for the remaining set of OS data that is determined to not be required (act 350), which are unhydrated and/or only partially hydrated copies of associated OS files found in the stored durable copy of the OS, wherein the unhydrated and partially hydrated copies omit at least some of the data from the associated OS files maintained in the stored durable copy of the OS.

Then, the computing system presents one or more of the placeholder files inaccurately with the new OS image, to one or more OS components, as being completely hydrated files (act 360) (e.g., by presenting the placeholders as complete/functional copies containing all of the data from the corresponding files maintained by the durable copy of the OS, even though they don't), as previously described.

The methods associated with FIG. 3 and many of the other disclosed methods are referenced as being capable of reducing OS imaging time by using Just in Time (JIT) file delivery. The term JIT is used to illustrate the on-demand nature provided by the disclosed embodiments in which the files copied during OS imaging are copied just in time for their required functionality and/or just in time to avoid unnecessary processing burdens. More particularly, the files in the minimum set of files determined to be critical for booting and predetermined OS functionality are copied completely, during the initial imaging, (just when needed), and while the remaining files are only copied completely (just when needed) in response to requests for the data and/or (just in time) to avoid creating unnecessary burdens on the computing system by waiting for available/unused bandwidth.

For instance, some embodiments include methods for hydrating the placeholder file(s) by completing the copy of data from the durable OS image to the new OS image, on demand and/or in response to detecting available bandwidth and/or in a particular sequential ordering of priorities. While other embodiments include refraining from hydrating one or more of the placeholder file(s) in response to determining it is not necessary.

Even further to the point, the flow diagram of FIG. 4 illustrates acts associated with processing requests for placeholder files/data and responding accordingly, so as to provide requested data on demand and to only copy the requested data when it is determined to be necessary and by using just in time techniques referenced above. Additionally, FIG. 5 illustrates other acts associated with methods for incrementally hydrating placeholder files using just in time techniques referenced above.

For instance, the flow diagram 400 of FIG. 4 illustrates acts in which a computing system responds to receiving requests associated with particular data of a placeholder file that is only partially hydrated or that is unhydrated relative to the corresponding durable copy of the file in the OS image stored in durable storage (act 410). The system determines whether the type of request received required actual access to the particular data (act 420) or merely to metadata of the file, for example. The system also determines whether the particular data has already been written to the placeholder file (act 430), such as be evaluating the file in the file system.

Then, in response to determining the particular data is not written to the placeholder file and that the actual access to the particular data is required, the system accesses and copies the requested and/or all of the data from the copy of the file maintained in the copy of the OS image in durable storage to the placeholder file (act 440). This will, in some instances, fully hydrate the placeholder file. In other instances, it only partially hydrates the placeholder file.

Alternatively, in response to determining that the actual access to the particular data is not required from the placeholder file, the system refrains from copying the particular data from the durable copy of the file (found in the copy of the OS image in durable storage) to the placeholder file of the new OS image (act 450). This may include, for example, determining the request only requires metadata for the file and not the particular data contained within the file.

In such instances, the system presents the placeholder file incorrectly to the requesting system component(s) as though the file has the particular data and is fully hydrated (act 460). This may be accomplished, for example, by providing accurate and/or inaccurate metadata of the file (such as a handle, a file type and a file size of the file) to the requesting component(s).

Subsequently to presenting the placeholder file incorrectly as a fully hydrated file, the system fully hydrates the placeholder file by copying in the particular data from the copy of the OS image in durable storage (act 470), such as in response to a new request that requires access to the particular data and/or in response to determining the system is idle and/or has extra processing bandwidth that is being unused and that is responsively allocated to making the copy.

The flow diagram 500 of FIG. 5 illustrates related acts for hydrating the placeholder files. For example, the system first identifies a set of placeholder files of a file system that are only partially hydrated and/or that are unhydrated relative to copies of corresponding files maintained in an OS image stored in durable storage (act 510). This act is performed, in some instances, at any time after the initial set of files that are determined to be critical for booting of the OS with minimum OS functionality are completely copied to the new OS image. In some instances, the act is performed in response to detecting idle processing of the computing system after the initial set of files is completely copied to the new OS image. In other embodiments, act 510 is performed in response to a specific user request to complete imaging of the OS, but without requiring the user to request access to specific data from any particular placeholder file.

Then, the system starts to incrementally hydrate the plurality of placeholder files (act 520) after act 510 is performed and/or during the performance of act 510.

In some instances, act 520 is performed for hydrating particular files prior to receiving any computer and/or user request for data associated with or omitted from the placeholder files. This act may include, for example, the associated as of detecting idle/unused and available processing bandwidth of the computing system and utilizing the available processing bandwidth to hydrate the plurality of placeholder files by accessing and copying data from the stored durable copy of the OS without degrading performance of other processes being performed by the computing system due to the hydration of the plurality of placeholder files (act 522). It will be appreciated that this act will be an iterative process, in some embodiments, by undergoes several pause and resume phases in response to detected changes in the available processing bandwidth of the computing system and to avoid contests/races for the computing system processing bandwidth, by only resuming the processing of act 522 when it is determined there is unused and available processing bandwidth to direct to the processing of act 522.

Act 520 alternatively and/or additionally includes the associated act 524, in some embodiments, which involves identifying relative preferences or priorities for hydrating the plurality of placeholder files according to historical use and/or specified preferences. In such embodiments, the system automatically performs incremental hydration of the placeholder files according to the set of preferences or priorities that are determined by accessing and copying data into the plurality of placeholder files from the stored durable copy of the OS that is determined to be more highly preferred or associated with a more relatively high priority than relatively lower priority data. This determination of priorities is made by the monitor agent, user input, the file system and/or third-party system data associated with historical preferences/use data and/or explicit priority designations.

While most embodiments described above reference the copying of files for the new OS image and/or hydrating of placeholder files in the new OS image from the durable OS image maintained in the local storage of the computing system with the OS that is being reimaged, it will be appreciated that any of the files copied from the durable OS image can come from local storage and/or a remote storage to the computing system where the durable OS image files are stored.

Furthermore, although the foregoing subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

The disclosed methods are implemented by a special-purpose or general-purpose computer including computer hardware, such as, for example, one or more processors (such as processor(s) 120) and system memory (such as contained in storage 115), as referenced in FIG. 1. Embodiments of the invention also include the disclosed systems as well as physical and other computer-readable hardware storage or other computer-readable media for carrying or storing computer-executable instructions and/or data structures that are executable to implement the disclosed methods.

The referenced computer-readable media are accessible by and executable by the processors of the general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that are used to store desired program code means in the form of computer-executable instructions, data, or data structures and that is accessed by a general-purpose or special-purpose computer.

The disclosed computer systems, as previously referenced, may be connected (via a wired or wireless connection) to remote devices through a network comprising one or more data links and/or data switches that enable the transport of electronic data between computer systems, modules, and/or other electronic devices. When information is transferred, or provided, over the network (either hardwired, wireless, or a combination of hardwired and wireless) to a computer, the computer properly views the connection as a transmission medium. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to perform OS (operating system) imaging using JIT (Just in Time) file delivery, the computing system comprising:
   a hard drive having a stored hard drive copy of an OS, including a plurality of OS files;
   a file system that is configured to store the OS files;
   one or more file system filter drivers configured to receive access requests to the OS files;
   one or more processors; and
   stored computer-executable instructions which are executable by the one or more processors to cause the computing system to perform a method of OS imaging using JIT file delivery, the method comprising:
      identifying a minimum set of OS data that is required to create an OS image that is bootable with a predetermined set of OS functionality for the computing system;
      identifying a remaining set of OS data that is determined to not be required to at least create the OS image that is bootable with the predetermined set of OS functionality;

for the minimum set of OS data that is required, creating a copied set of OS files in the file system from the stored hard drive copy of an OS that contains the minimum set of OS data;

for the remaining set of OS data that is determined to not be required, creating placeholder files comprising unhydrated and/or only partially hydrated copies of associated OS files found in the stored hard drive copy of the OS;

initiating booting of the OS in the computing system and presenting the placeholder files inaccurately, as completely hydrated files of the file system, to one or more OS components during the booting of the OS; and incrementally hydrating the placeholder files after booting the OS.

2. The system of claim 1, wherein the method further includes:

in response to detecting a read request for particular data associated with a placeholder file that is not in the placeholder file, accessing and copying the particular data from the stored hard drive copy of the OS into one or more of the unhydrated and/or only partially hydrated copies.

3. The system of claim 1, wherein the method further includes:

in response to detecting a read request for particular data associated with a placeholder file that is in the placeholder file, refraining from accessing and copying the particular data from the stored hard drive copy of the OS into one or more of the unhydrated and/or only partially hydrated copies until a request is made for additional data associated with the placeholder file that is not yet copied into the placeholder file.

4. The system of claim 1, wherein the method further includes:

detecting available processing bandwidth of the computing system; and in response to detecting available processing bandwidth of the computing system, automatically performing incremental hydration of the placeholder files by accessing and copying data from the stored hard drive copy of the OS into one or more of the unhydrated and/or only partially hydrated copies.

5. The system of claim 1, wherein the method further includes:

performing the method in response to detecting a request to reimage the OS;

identifying a set of preferences or priorities for particular data that has not yet been requested of or by the OS since the request to reimage the OS; and automatically performing incremental hydration of the placeholder files according to the set of preferences or priorities by accessing and copying data from the stored hard drive copy of the OS that is determined to be more highly preferred or associated with a more relatively high priority than relatively lower priority data into one or more of the unhydrated and/or only partially hydrated copies.

6. The system of claim 5, wherein the set of preferences or priorities is based on a historical log of frequency and/or recency of the data that is being copied having been accessed by the OS prior to the request to reimage the OS.

7. The system of claim 5, wherein the one or more file system filter drivers presents the placeholder files as completely hydrated files to the one or more OS components.

8. The system of claim 5, wherein the accessing and copying the particular data from the stored hard drive copy results in completely hydrating at least one previously unhydrated and/or only partially hydrated copy.

9. The system of claim 1, wherein the presenting of the placeholder files inaccurately as completely hydrated files includes identifying a minimum set of file attributes that are required to established and presented by the placeholder files in the file system to cause the one or more OS components to view the placeholder files as fully hydrated files.

10. The system of claim 9, wherein the placeholder files are distinguished from sparse files and are not detectable as sparse files by the OS components.

11. The system of claim 1, wherein the minimum set of OS data comprises a minimum set of files rather than only limited and incomplete portions of files.

12. The system of claim 1, wherein the method further includes accessing at least some remote OS data from a remote store to at least partially hydrate at least one of the placeholder files with the remote OS data.

13. The system of claim 1, wherein identifying the minimum set of OS data that is required to create the OS image that is bootable with the predetermined set of OS functionality comprises identifying at least a set of one or more applications and application functionality that has been used by one or more users of the computing system recently and/or frequently and prior to receiving a request to reimage the OS.

14. The system of claim 1, wherein the minimum set of OS data that is required is less than 50% of the remaining set of OS data that is determined not to be required.

15. A computer-implemented method for performing OS (operating system) imaging using JIT (Just in Time) file delivery, the method comprising:

identifying a minimum set of OS data that is required to create an OS image that is bootable with a predetermined set of OS functionality for a computing system;

identifying a remaining set of OS data that is determined to not be required to at least create the OS image that is bootable with the predetermined set of OS functionality;

creating a copied set of OS files in a file system of the computing system from a stored hard drive copy of an OS that contains the minimum set of OS data;

for the remaining set of OS data that is determined to not be required, creating placeholder files comprising unhydrated and/or only partially hydrated copies of associated OS files found in the stored hard drive copy of the OS;

initiating booting of the OS in the computing system and presenting the placeholder files inaccurately, as completely hydrated files of the file system, to one or more OS components during the booting of the OS; and incrementally hydrating the placeholder files after booting the OS.

16. The method of claim 15, wherein the method further includes:

in response to detecting a read request for particular data associated with a placeholder file that is not in the placeholder file, accessing and copying the particular data from the stored hard drive copy of the OS into one or more of the unhydrated and/or only partially hydrated copies.

17. The method of claim 15, wherein the method further includes:
  in response to detecting a read request for particular data associated with a placeholder file that is in the placeholder file, refraining from accessing and copying the particular data from the stored hard drive copy of the OS into one or more of the unhydrated and/or only partially hydrated copies until a request is made for additional data associated with the placeholder file that is not yet copied into the placeholder file.

18. The method of claim 15, wherein the method further includes:
  detecting available processing bandwidth of the computing system; and
  in response to detecting available processing bandwidth of the computing system, automatically performing incremental hydration of the placeholder files by accessing and copying data from the stored hard drive copy of the OS into one or more of the unhydrated and/or only partially hydrated copies.

19. The method of claim 15, wherein the method further includes:
  performing the method in response to detecting a request to reimage the OS;
  identifying a set of preferences or priorities for particular data that has not yet been requested of or by the OS since the request to reimage the OS; and
  automatically performing incremental hydration of the placeholder files according to the set of preferences or priorities by accessing and copying data from the stored hard drive copy of the OS that is determined to be more highly preferred or associated with a more relatively high priority than relatively lower priority data into one or more of the unhydrated and/or only partially hydrated copies.

20. The method of claim 19, wherein one or more file system filter drivers presents the placeholder files as completely hydrated files to the one or more OS components.

* * * * *